United States Patent
Bennett

(10) Patent No.: US 7,948,562 B2
(45) Date of Patent: May 24, 2011

(54) SYSTEM AND METHOD FOR CONTROLLING TV DISPLAY LAMP BRIGHTNESS

(75) Inventor: William George Bennett, Vista, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1253 days.

(21) Appl. No.: 11/583,522

(22) Filed: Oct. 18, 2006

(65) Prior Publication Data

US 2008/0094518 A1    Apr. 24, 2008

(51) Int. Cl.
*H04N 7/01* (2006.01)

(52) U.S. Cl. ...................................... 348/602

(58) Field of Classification Search .................. 348/602, 348/604, 687, 678, 734, 725, 553; 345/156; 358/520

See application file for complete search history.

(56) References Cited

U.S. PATENT DOCUMENTS

| 4,647,788 A | 3/1987 | Maile et al. ............... 307/117 |
| 2006/0139245 A1* | 6/2006 | Sugiyama ...................... 345/60 |
| 2006/0187195 A1* | 8/2006 | Chung ........................... 345/156 |
| 2008/0024674 A1* | 1/2008 | Park .............................. 348/687 |

FOREIGN PATENT DOCUMENTS

KR    9508428 B1    7/1995

\* cited by examiner

*Primary Examiner* — Paulos M Natnael
(74) *Attorney, Agent, or Firm* — John L. Rogitz

(57) ABSTRACT

The remote control signal receiver of a TV sends not only user-generated commands to the TV processor but also, when no commands are sensed, an ambient light signal that can be used to adjust the brightness of the TV.

10 Claims, 1 Drawing Sheet

SYSTEM AND METHOD FOR CONTROLLING TV DISPLAY LAMP BRIGHTNESS

I. FIELD OF THE INVENTION

The present invention relates generally to systems and methods for establishing TV display brightness automatically using the TV remote control signal sensor.

II. BACKGROUND OF THE INVENTION

TVs, particularly those with flat panel displays such as liquid crystal displays (LCD) and rear projection TVs, present a challenge in establishing an optimal brightness of the LCD elements/rear projection lamp(s). More particularly, greater brightness is required for picture visibility in areas of bright ambient light, while less brightness is required when the ambient light is low, but always establishing a maximum brightness to account for visibility concerns in high ambient light shortens the useful life of the LCD elements/rear projection lamp(s), which is a waste in the event that the TV is disposed in a low ambient light area. Greater heat is also generated by high brightness settings, which adversely affects electronics in the TV and which consequently is again wasteful in the event that the TV is disposed in a low ambient light area that does not require high TV brightness.

The present invention recognizes that it would be desirable to adjust the brightness of a TV based on ambient light levels without unduly multiplying circuitry within the TV.

SUMMARY OF THE INVENTION

A TV has a TV tuner, a TV display, and a TV processor causing TV signals from the tuner to be presented on the display. The TV also has a brightness control circuit that establishes a brightness of the display. A control signal receiver on the TV sends signals to the TV processor, and the processor executes a user-generated command if the signals are generated from reception of command signals from a remote control. Also, the brightness control circuit can be controlled at least in part based on the signals from the receiver to establish a brightness of the display.

In non-limiting implementations the processor uses the signals from the receiver to control the brightness control circuit. In such an embodiment, the processor can determine whether the signals contain user command signal information received from the remote control, and if so the processor does not use the signals to establish a display brightness until such time as the signals no longer contain user command signal information received from the remote control. The control signal receiver may be a light sensor, and the system can, if desired, include no other light sensors. In another implementation, the signal from the receiver is output from the receiver in analog format, with the signal in analog format being sent to the brightness control circuit to establish a brightness of the display.

In another aspect, a method for establishing the brightness of a TV display and for controlling the TV in response to user-generated command signals includes generating a signal representative of light reception. The method also includes determining whether the signal carries TV command information generated by a user manipulating a remote control. If the signal carries TV command information, the method executes the command represented by the signal. Otherwise, the method establishes a TV display brightness at least in part on the signal.

In yet another aspect, a TV system includes a TV including a TV tuner, a TV display, and a TV processor that causes TV signals from the tuner to be presented on the display. A brightness control circuit is provided for establishing a brightness of the display. The system further includes a user-manipulable remote control and a control signal receiver configured to receive command signals from the remote control and to output receiver signals. Means are accessible to the processor for establishing a non-user-defined brightness of the display based on a first receiver signal and for executing a user command based on a second receiver signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
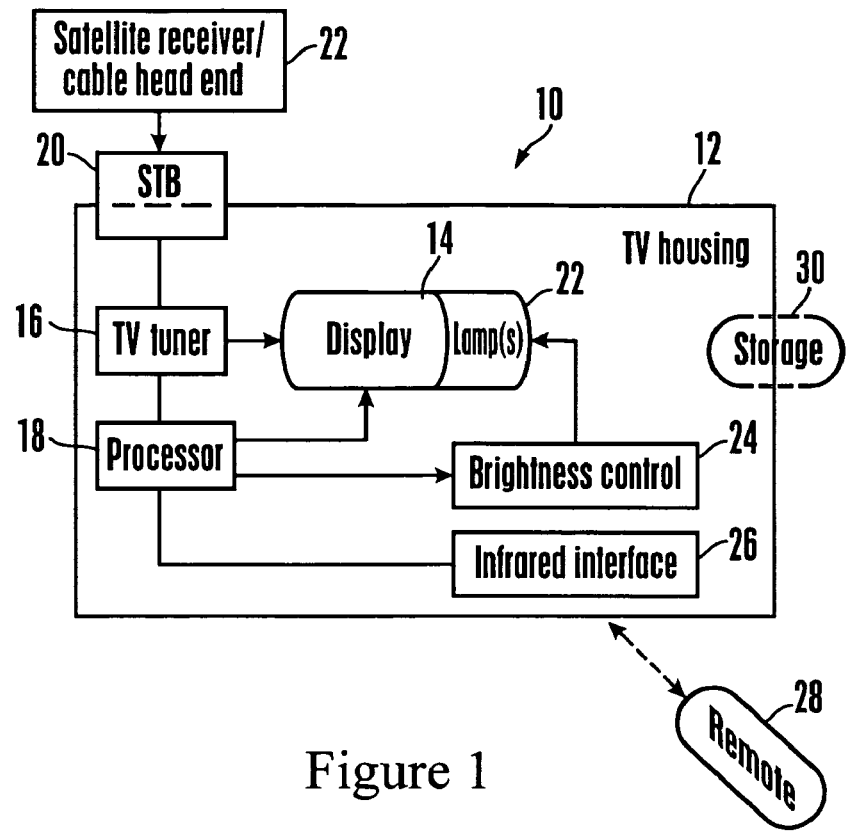
FIG. 1 is a block diagram of a non-limiting system in accordance with the invention.

Referring initially to FIG. 1, a system is shown, generally designated 10, which includes a TV housing 12 holding TV components including a TV display 14, a TV tuner 16, and a TV processor 18. The TV tuner 16 may receive input from a set-top box (STB) 20 that, as indicated in FIG. 1, can be part of the housing 12 or alternatively can be in a housing separate from the housing 12. In any case, the STB 20 receives TV signals from one or more sources 22 such as but not limited to satellite receivers, cable system head ends, broadcast receiver antennae, etc. Depending on the nature of the signal, it may be sent directly to the display 14 from the tuner 16 or sent first through the processor 18 for subsequent display.

In any case, the display 14 typically includes one or more lamps 22. If the display is a flat panel display such as a LCD display, the lamps 22 are the individual liquid crystals of the display. If the display 14 is a rear projection display, the lamp(s) 22 are the rear projection illuminating lamp(s). A brightness control circuit 24 drives the lamps 22 by inputting a current or voltage that is established as appropriate for a particular brightness, e.g., a higher input current or voltage might be input to the lamps 22 to achieve a high display brightness whereas a lower input current or voltage might be input to the lamps 22 to achieve a low display brightness. In a simplified non-limiting implementation the brightness control circuit can include a variable resistor that is configured to send the desired current/voltage level to the lamps 22.

In the non-limiting embodiment shown, the TV processor 18 or other logic circuit can control the brightness control circuit 24 to establish a processor-determined brightness of the display 14 without user interaction or intervention. Or, the analog signal from the below-described IR interface can be used as direct input to the brightness control circuit 24, in which case the circuit 24 includes analog circuitry configured to establish a display brightness based on the analog signal along the lines of the logic described below.

As set forth further below, the processor 18 or other logic circuit receives input in digitized format of a signal generated by a control signal receiver such as but not limited to an infrared (IR) interface 26, typically including an IR receiver. When the digitized signal represents command words as is the case when a user has manipulated a portable hand-held remote control 28 in accordance with principles known in the art, the processor executes the commands indicated by the signal, e.g., change channels, change volume, etc. As mentioned above, the processor can also use the digitized version of the signal from the receiver to execute the brightness control logic. A TV data storage 30 such as a solid state memory device may also be provided.

Figure 2:
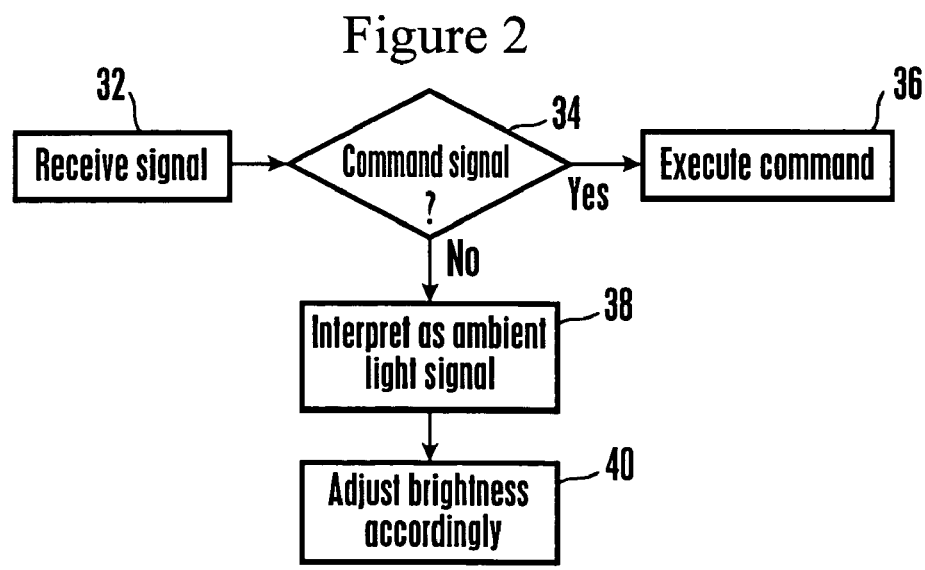
FIG. 2 shows non-limiting logic in accordance with present principles.

Turning to FIG. 2 to understand the logic that can be implemented by the system shown in FIG. 1, which if desired can be stored in the data storage 30 when implemented by the processor 18, at block 32 the signal from the control signal receiver is received by the TV processor 18. At decision diamond 34 the processor 18 determines whether it recognizes any commands in the signal, i.e., whether any command information from the remote control 28 is present in the signals. If it does, indicating that a command has been received from the remote control 28, the command is executed at block 34.

On the other hand, if no command is recognized in the signal from the control signal receiver, the logic interprets the signal, at block 38, to represent the level of ambient light at the receiver. Accordingly, the logic moves to block 40 wherein the processor 18 adjusts the brightness setting of the brightness control circuit 24 according to the ambient light, typically establishing a higher brightness for the lamps 22 when the ambient light level is high and a lower brightness in low ambient light, with a sliding scale that can if desired vary linearly between maximum and minimum lamp brightness as ambient light levels vary between a maximum and minimum. In establishing the brightness based on ambient light level, the processor can access a table using the signal from the receiver as entering argument and look up the nearest matching brightness level.

In another implementation summarized above, the analog output of the receiver can be sent directly to the brightness control circuit, which contains circuitry to implement the logic above in block 40. In such an implementation the TV processor 18 is not used to control brightness but only to execute commands as embodied in command words present in a digitized version of the signal from the receiver.

In any case, it may now be appreciated that the system 10 need incorporate one and only one light sensor the output of which does double duty, namely, representing a command when a signal from the remote control 28 is received and otherwise representing an ambient light level that is used to adjust display brightness. Furthermore, because the non-limiting logic of FIG. 2 discriminates between command signals and non-command signals when the processor 18 is used to control brightness, brightness is not varied in response to command signals, but only in response to non-command (ambient light) signals.

While the particular SYSTEM AND METHOD FOR CONTROLLING TV DISPLAY LAMP BRIGHTNESS is herein shown and described in detail, it is to be understood that the subject matter which is encompassed by the present invention is limited only by the claims.

What is claimed is:

1. A system, comprising:
    a TV including a TV tuner;
    a TV display;
    a TV processor causing TV signals from the tuner to be presented on the display;
    a brightness control circuit establishing a brightness of the display; and
    a control signal receiver sending signals to the TV processor, the processor executing at least one user-generated command if the signals are generated from reception of command signals from a remote control, a brightness control circuit being controlled at least in part based on the signals from the receiver to establish a brightness of the display, wherein the processor receives a signal from the control signal receiver, determines whether the signal is a command signal to execute, and responsive to determining that the signal is a command signal to execute, executing a command represented by the signal, and responsive to determining that the signal is not a command signal to execute, interpreting the signal as an ambient light signal for adjusting brightness of the TV display.

2. The system of claim 1, wherein the control signal receiver is a light sensor, and the system includes no other light sensors.

3. The system of claim 1, wherein the display is a rear projection display.

4. The system of claim 1, wherein the display is a flat panel display.

5. The system of claim 1, wherein the signal from the receiver is output from the receiver in analog format, the signal in analog format being sent to the brightness control circuit to establish a brightness of the display.

6. A TV system comprising:
    a TV including a TV tuner;
    a TV display;
    a TV processor causing TV signals from the tuner to be presented on the display;
    a brightness control circuit establishing a brightness of the display;
    a user-manipulable remote control;
        a control signal receiver configured to receive command signals from the remote control, the receiver outputting receiver signals; and
        means accessible to the processor for establishing a non-user-defined brightness of the display based on a first receiver signal and for executing a command based on a second receiver signal, wherein the processor receives a signal from the control signal receiver, determines whether the signal is a command signal to execute, and responsive to determining that the signal is a command signal to execute, executes a command represented by the signal, and responsive to determining that the signal is not a command signal to execute, interprets the signal as an ambient light signal for adjusting brightness of the TV display.

7. The system of claim 6, wherein the control signal receiver is a light sensor, and the system includes no other light sensors.

8. The system of claim 6, wherein the display is a rear projection display.

9. The system of claim 6, wherein the display is a flat panel display.

10. The system of claim 9, wherein the display is a liquid crystal display (LCD).

* * * * *